W. A. YARGER.
DEMOUNTABLE RIM HOLDER.
APPLICATION FILED SEPT. 14, 1917.
1,279,629.
Patented Sept. 24, 1918.
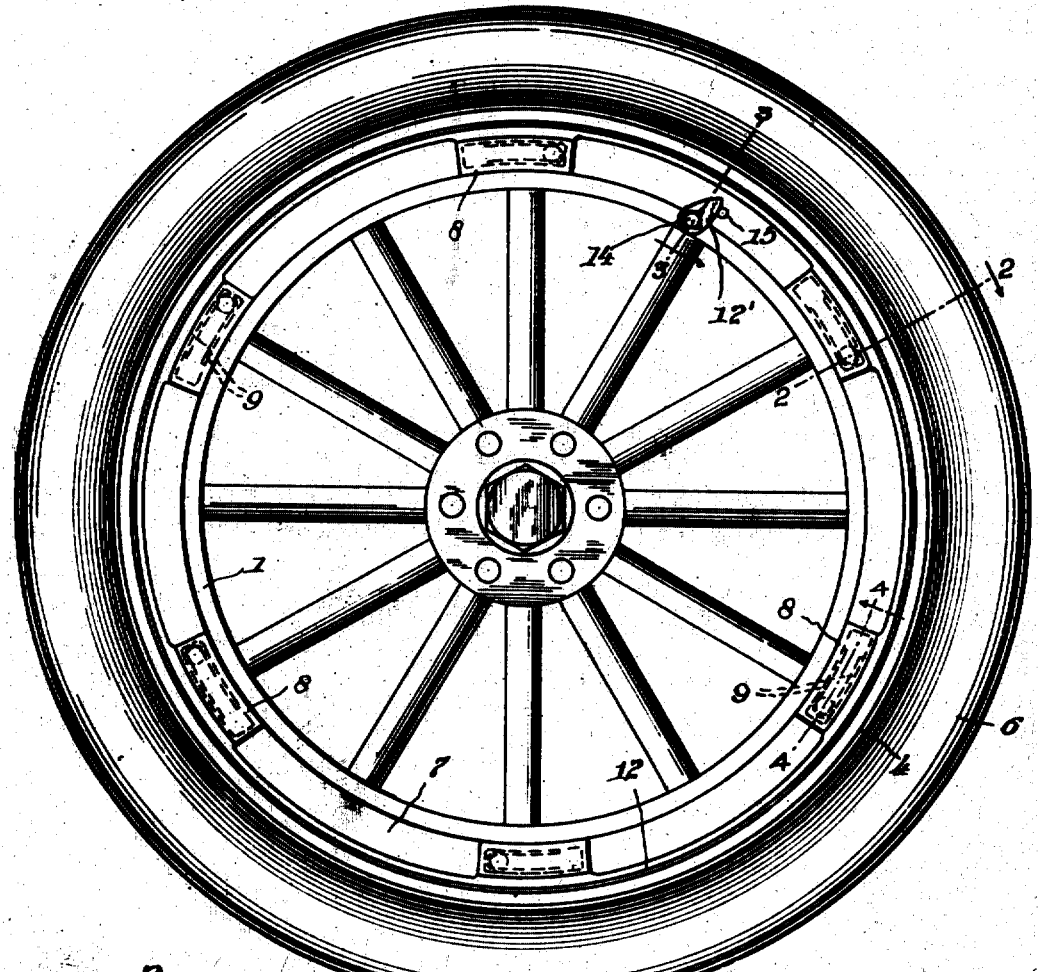
Fig.1.
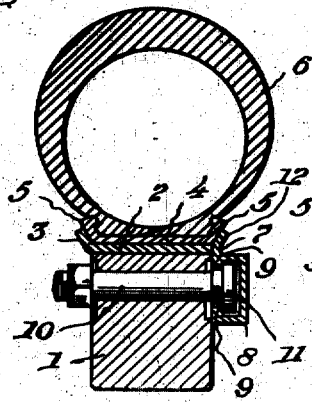
Fig.2.
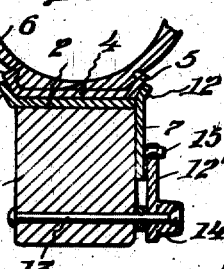
Fig.3.
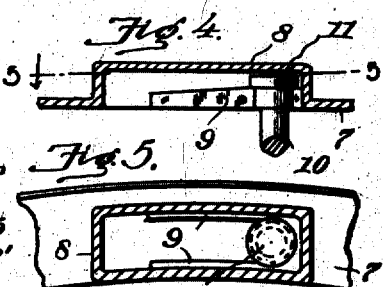
Fig.4.
Fig.5.
INVENTOR
William A. Yarger.
By F. W. Bond
ATTORNEY

UNITED STATES PATENT OFFICE.

WILLIAM A. YARGER, OF AKRON, OHIO, ASSIGNOR OF ONE-HALF TO HORACE W. COWGILL, OF CANTON, OHIO.

DEMOUNTABLE-RIM HOLDER.

1,279,629.  Specification of Letters Patent.  Patented Sept. 24, 1918.

Application filed September 14, 1917.  Serial No. 191,467.

*To all whom it may concern:*

Be it known that I, WILLIAM A. YARGER, a citizen of the United States, residing at Akron, in the county of Summit and State of Ohio, have invented a new and useful Demountable-Rim Holder, of which the following is a specification.

My invention relates to demountable rim holders and has more especial reference to a device which may be easily and readily operated to remove or attach a demountable rim to the felly.

The object of the present invention is to provide a demountable rim holder which is easily and readily operated to quickly detach a demountable rim from a felly.

A further object is to provide means for tightly clamping the rim upon the felly and preventing accidental displacement of the rim.

These objects, together with other objects readily apparent to those skilled in the art, may be attained by the construction illustrated in the accompanying drawings, although the invention may be embodied in other forms, the construction illustrated being chosen by way of example.

In the accompanying drawing:

Figure 1 is a side elevation showing the different parts properly assembled.

Fig. 2 is a transverse section on line 2—2, Fig. 1.

Fig. 3 is a section on line 3—3, Fig. 1.

Fig. 4 is a section on line 4—4, Fig. 1.

Fig. 5 is a section on line 5—5, Fig. 4 looking down.

Similar numerals of reference indicate corresponding parts throughout the several figures of the drawings.

In the accompanying drawing 1 represents the felly which within itself forms no particular part of the present invention in so far as its detailed construction is concerned. Upon the periphery of the felly 1 is securely attached in any convenient and well known manner the fixed rim 2, one edge of which is provided with the up-turned flange 3. Upon this fixed rim 2 is located the demountable rim 4 which is provided with the up-turned flanges 5, which flanges are for the purpose of clenching and securing the tire casing 6. To one side of the felly 1 is located the locking or clamping ring 7 upon the outer face of which are located a series of housings 8 which housings may be formed integral with the locking ring 7 or they may be made separate and attached in any convenient and well known manner. Within the housings 8 are located the flanges 9, which flanges are formed of a length somewhat less than the length of the housing for the purpose hereinafter described. The outer edges of the flanges 9 are tapered as best illustrated in Fig. 4 and are so tapered for the purpose hereinafter stated. To the felly 1 are secured a number of bolts 10, the number corresponding with the number of housings 8. These bolts 10 are provided with the heads 11, which heads are formed of such a size that they will ride upon the inclined edges of the flanges 9.

It will be understood that by forming the flanges 9 of a length less than the length of the housing 8 sufficient openings or passages between the ends of the flanges 9 and the ends of the housings are provided, whereby the heads 11 can be entered into the housings. It is well understood that means should be provided whereby the demountable rim should be securely held or locked against lateral displacement and in order to accomplish this result the locking band 7 is provided with the outward extending flange 12 which flange is adapted for contact with the adjacent flange 5 formed upon the demountable rim 4. In use the locking ring 7 is placed in proper position with reference to the felly and in such a position that the heads 11 will register with the openings between the ends of the flanges 9 and the housings 8, after which the locking ring is given a slight rotary movement, which movement causes the flanges 9 to come under the heads 11 and as this slight rotary movement is continued the locking ring 7 will be drawn tightly against the adjacent flange 5 of the demountable rim 4, the opposite flange being set against the flange 3, thereby clamping the demountable rim 4 in such a manner that there can be no relative movement between the felly proper or the fixed rim 2 and the demountable rim 4. Some means should be provided whereby the slight rotary movement can be given to the locking ring 7, and I have illustrated one means for producing the rotary motion, which means consist of a rocking or rotary cam 12′, which is pivotally mounted upon the bolt 13. The cam 12′ is provided with the angular portion 14, upon which a wrench can be applied. The locking ring 7 is provided with the pin 15 which is so located that the edge of the cam 12' will come in contact with the pin 15. It is well understood that the cam is not absolutely necessary, owing to the fact that a rotary movement could be given to the locking ring by a thrust of a hammer or other tool upon the pin 15 and in some instances this may be desirable, if in the event the cam did not produce the desired amount of rotary motion to the locking ring to properly clamp the demountable rim 4.

Having fully described my invention what I claim as new and desire to secure by Letters Patent, is:

In a demountable rim holder of the class described, the combination of a felly, a rim fixed to the periphery of said felly and provided with an upwardly extending flange upon one of its edges, a demountable rim located upon the rim and provided with flanges upon its edges, a locking ring provided with a series of housings and a flange upon its periphery, flanges located within the housings, said flanges provided with inclined edges, a series of bolts secured to the felly and provided with heads, the heads of said bolts adapted to ride upon the flanges, a pin provided upon said locking ring and a cam pivotally mounted upon said felly and arranged to contact with said pin for imparting a slight rotary movement to the locking ring.

In testimony that I claim the above, I have hereunto subscribed my name.

WILLIAM A. YARGER.